United States Patent [19]

Akima

[11] 3,735,832

[45] May 29, 1973

[54] POWER STEERING APPARATUS FOR A VEHICLE

[75] Inventor: Akira Akima, Tokyo, Japan

[73] Assignee: Honda Giken Kogyo Kabushiki Kaisha, Japan

[22] Filed: Mar. 2, 1971

[21] Appl. No.: 120,164

[30] Foreign Application Priority Data

Mar. 3, 1970 Japan..............................45/17632

[52] U.S. Cl............180/79.2 R, 60/52 S, 137/625.24
[51] Int. Cl. ..............................................B62d 5/08
[58] Field of Search....................180/79.2 R; 60/52 S; 91/375; 137/625.22, 625.24

[56] References Cited

UNITED STATES PATENTS

| | | | |
|---|---|---|---|
| 2,917,079 | 12/1959 | Verbrugge et al. | 180/79.2 R X |
| 3,190,313 | 6/1965 | Rumsey | 91/375 X |
| 2,917,027 | 12/1959 | Hayse | 180/79.2 R X |
| 3,616,727 | 11/1971 | Suzuki et al. | 91/375 X |

FOREIGN PATENTS OR APPLICATIONS

| | | | |
|---|---|---|---|
| 704,912 | 3/1965 | Canada | 180/79.2 R |
| 883,654 | 12/1961 | Great Britain | 180/79.2 R |

Primary Examiner—Kenneth H. Betts
Assistant Examiner—Leslie J. Paperner
Attorney—Waters, Roditi, Schwartz & Nissen

[57] ABSTRACT

A power steering apparatus in which an oil pump is selectively connected to opposite chambers of a power steering cylinder by an operation valve driven by a steering handle. The operation valve comprises a rotary disk enclosed in a valve chamber having supply and return lines in one side surface thereof, the disk having fluid conducting openings in the form of through bores to connect the supply and return lines together in a neutral steering position, and to connect them respectively to the opposite chambers in the power steering cylinder in right and left steering positions. The opposite side surface of the valve chamber is formed with areas on which the oil acts which are symmetrical with the supply and return openings at the other side of the valve chamber and these areas are in communication with the supply and return openings via through bores in the rotary disk.

1 Claim, 7 Drawing Figures

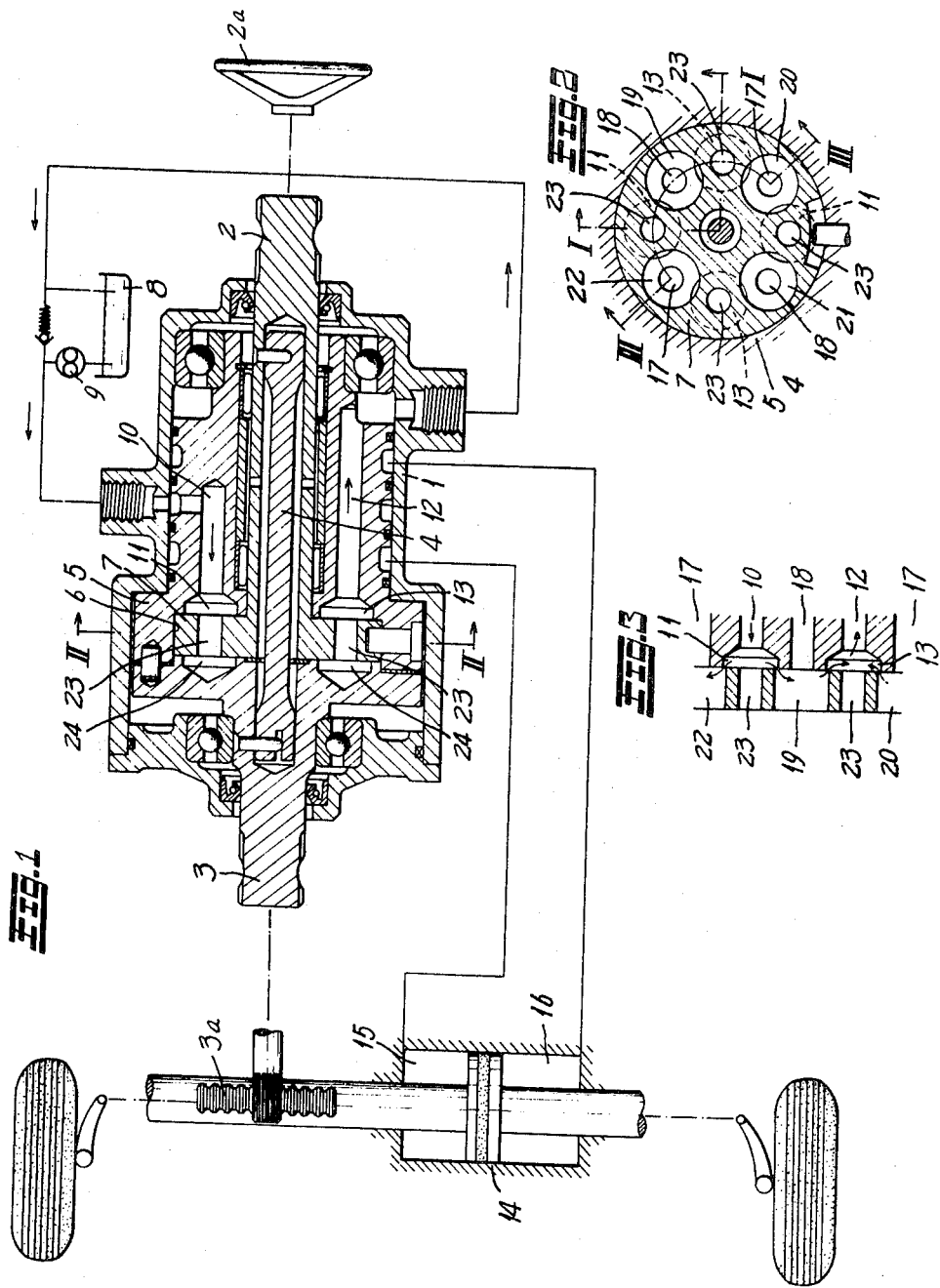

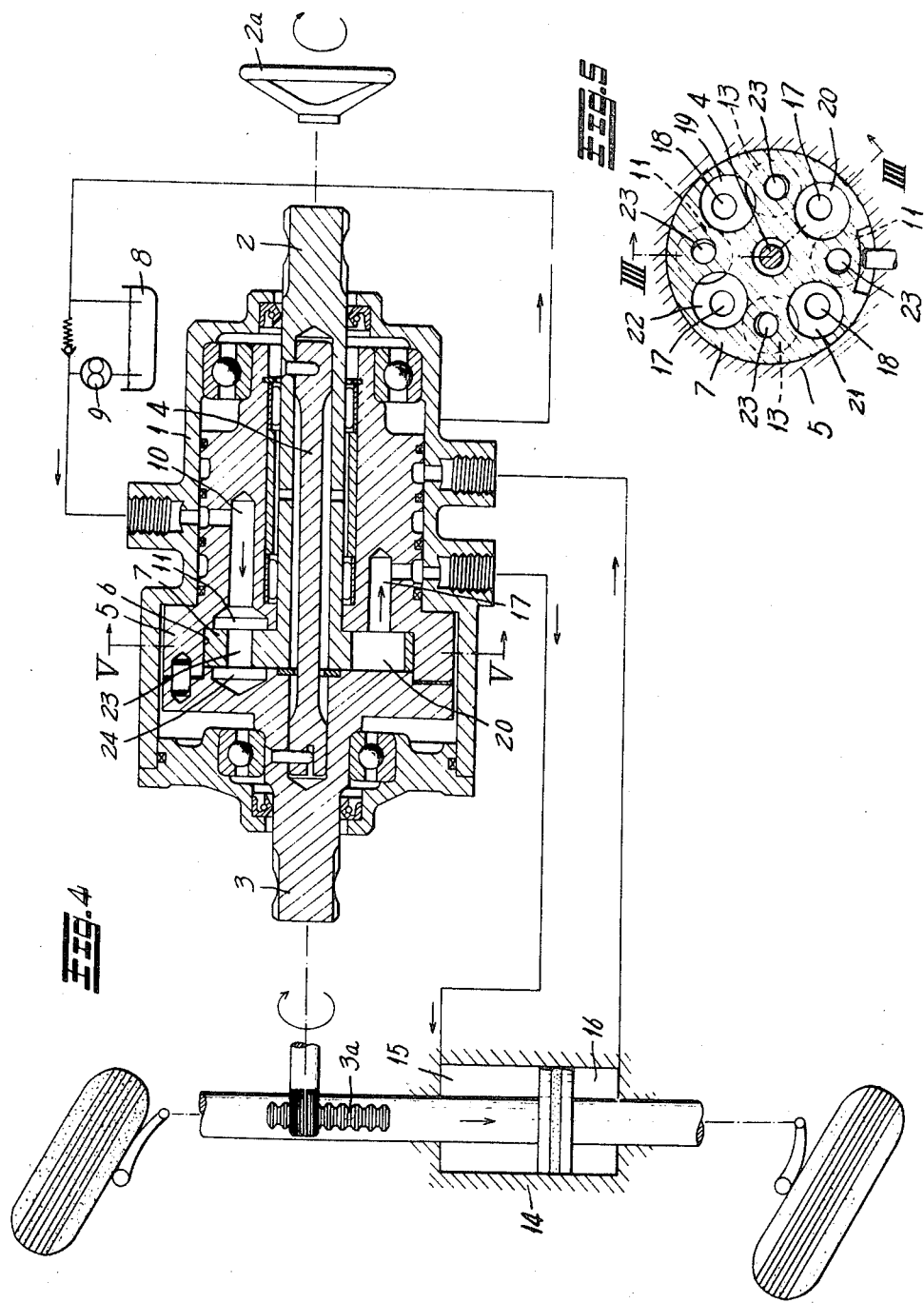

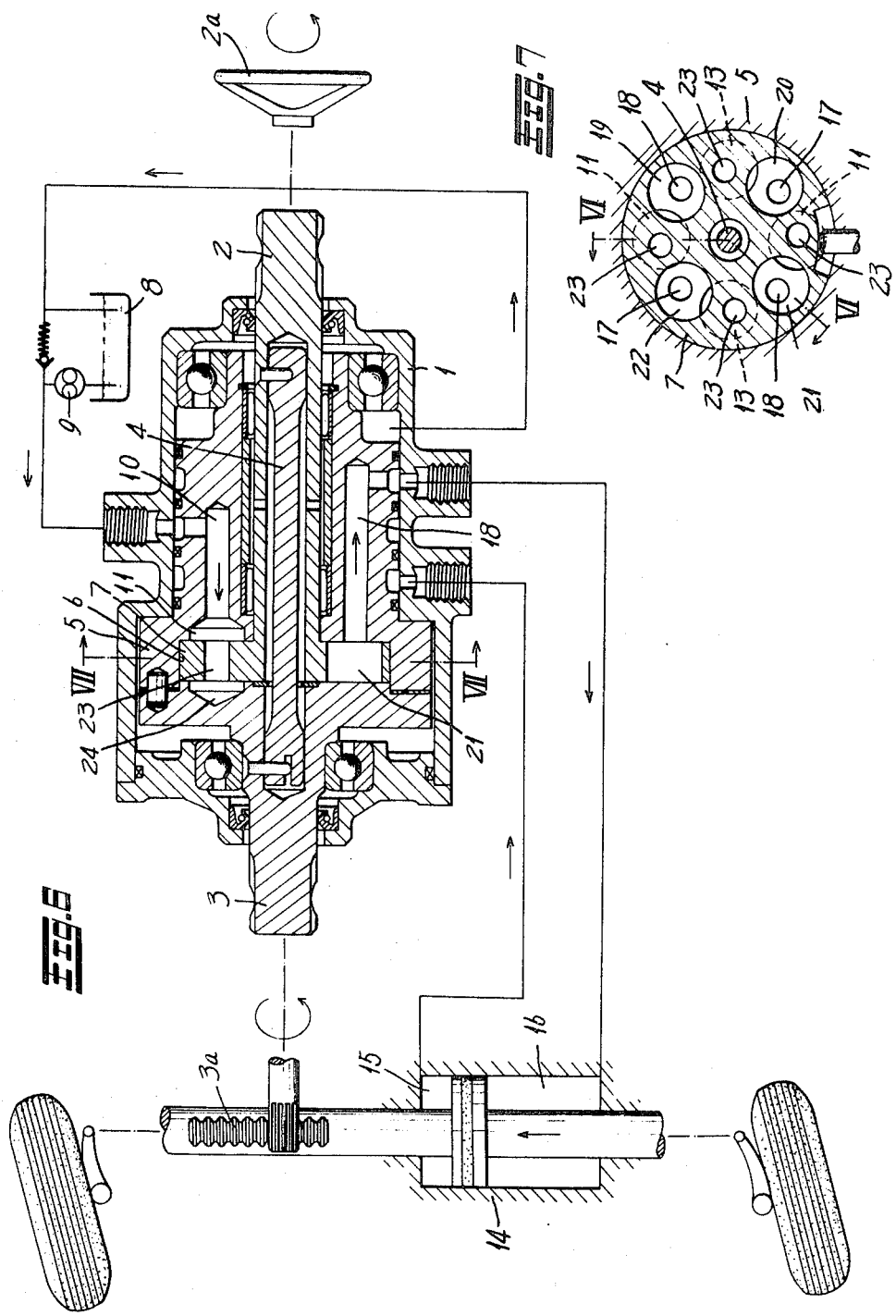

3,735,832

POWER STEERING APPARATUS FOR A VEHICLE

BRIEF SUMMARY OF THE INVENTION

This invention relates to power steering apparatus in vehicles such as motorcars or the like of the type in which an oil pump is selectively connected to opposite end chambers of a power steering cylinder through an operation valve controlled by a steering handle.

An object of the invention is to provide such a steering apparatus wherein the operation valve is of rotary type so that the apparatus can be of small size and reliable in valve operation and yet be smooth and light in handling.

According to this invention, in a power steering apparatus of the type in which an oil pump is selectively connected to either of opposite end chambers of a power steering cylinder through an operation valve driven by a steering handle, the operation valve is formed as a rotary disk contained in a valve chamber having oil supply and oil return openings in one side surface thereof, oil conducting openings being provided in the rotary disk for communicating the oil supply and oil return openings, the conducting openings being constituted as bores passing through the rotary disk, the other side surface of the valve chamber having surfaces on which oil pressure acts, which surfaces are symmetrical with those formed in said one side surface of the valve chamber by the front openings of the oil supply and oil return openings, these surfaces on the opposite sides of the valve chamber being in communication one with another by through bores in the rotary disk.

BRIEF DESCRIPTION OF THE DRAWING

FIG. 1 is a diagrammatic illustration showing a neutral condition of power steering apparatus according to this invention, and partly in section as taken along line I — I in FIG. 2;

FIG. 2 is a sectional view taken along line II — II in FIG. 1;

FIG. 3 is a sectional view taken along line III — III in FIG. 2;

FIG. 4 is a sectional view taken along the line IIII—IIII in FIG. 5 and shows the power steering apparatus in position for a right turn;

FIG. 5 is a sectional view taken along line V — V in FIG. 4;

FIG. 6 is a sectional view taken along line VI — VI in FIG. 7 and shows the power steering apparatus in position for a left turn; and FIG. 7 is a sectional view taken along line VII — VII in FIG. 6.

DETAILED DESCRIPTION

Referring to the drawing, numeral 1 denotes a casing of a valve control for a power steering apparatus, and mounted in the casing at opposite ends thereof are an input shaft 2 connected to a steering handle 2a and an output shaft 3 connected to a steering rack 3a. The shafts 2 and 3 are inserted in the casing 1 at the front and rear thereof, respectively, so as to be in alignment with one another, and the shafts 2 and 3 are connected together through a torsion bar, so that a relative angular deflection can exist between the two shafts 2 and 3 when a torque is applied therebetween. A valve body 5 is secured to the output shaft 3 at its inner end and the valve body serves for receiving and delivering an operating fluid, such as oil. Numeral 6 denotes a valve chamber formed in the valve body 5. A rotary disk 7 is integrally formed with the input shaft 2 at its inner end, and the disk 7 is in the form of a flange. The disk 7 is rotatably enclosed in the valve chamber 6. A pair of oil supply passages 10 are in communication with an oil pump 9 having an oil reservoir 8, the passages 10 being formed in the valve body 5 such that they have larger diameter cavities 11 at their front ends which open to one side surface of the valve chamber 6 so as to be arranged at two diametrically opposed positions which are symmetrical with one another. A pair of oil return passages 12 are in communication with the oil reservoir 8 and are also formed in the valve body 5 with larger diameter cavities 13 at their front ends which open at the same side surface of the valve chamber 6 so as to be disposed between the cavities 11. The cavities 13 are diametrically opposed to one another along a diameter at right angles to the diameter along which cavities 11 are aligned. Additionally provided are a pair of oil delivery passages 17 and a pair of oil delivery passages 18. The passages 17 are in communication with one end chamber 15 of a power cylinder 14, and the passages 18 are in communication with the other end chamber 16 of the power cylinder 14. The passages 17 and 18 are also formed in the valve body 5 such that they are open at their front open ends in the same side surface of the valve chamber 6 so as to be disposed at four positions each being between adjacent cavities 11 and 13.

The rotary disk 7 is provided at four positions, each of which corresponds to an intermediate position of the adjacent cavities 11 and 13 with four oil conducting openings 19, 20, 21 and 22, and each of these openings 19, 20, 21 and 22 is formed as a bore passing through the rotary disk 7 and having substantially the same diameter as that of each of the cavities 11 and 13. The openings 19, 20, 21 and 22 are so arranged that, at a neutral position as shown in FIGS. 1 and 2, each thereof partly overlaps and is in communication with the opposite side cavities 11 and 13, so that in this condition the oil supplied from the oil pump 9 flows from each cavity 11 connected to each oil supply passage 10 to the opposite oil conducting openings 19, 22 and 20, 21, respectively, and thence through each cavity 13 and each oil return passage 12 to return to the oil reservoir 9. Thus the oil does not flow into the power cylinder 14.

If the rotary disk 7 is given a right turning movement through the input shaft 2, as shown in FIGS. 4 and 5, each cavity 11 overlaps only the oil conducting opening 20 or 22, so that the oil supplied from each oil supply passage 10 flows from the oil conducting openings 20 and 22, respectively, and through the respective oil delivery passages 17 into end chamber 15 of the power cylinder 14, and thus the power cylinder 14 is operated.

If, however, the rotary disk 7 is given a left turning movement through the input shaft 2, as shown in FIGS. 6 and 7, each cavity 11 overlaps only the oil conducting opening 29 or 21, so that the oil supplied from each oil supply passage 10 flows from the oil conducting openings 19 and 21, respectively and through the respective oil delivery passages 18 into the chamber 16 of the power cylinder 14, and thus the power cylinder 14 is operated.

The oil conducting openings 19, 20, 21 and 22 in the rotary disk 7 are formed as through bores in the disk 7, so that it can be prevented that the oil pressure acts only on one side surface of the rotary disk 7 to cause resistance against rotary movement thereof.

Though the oil supply and oil return passages 10 and 12 are arranged to face one side surface of the rotary disk 7 at their end cavities 11 and 13 as mentioned before, at the position corresponding to these cavities 11 and 13, according to the invention, respective bores 23 are made in the rotary disk 7 and respective circular cavities 24 are made in the opposite side surface of the valve chamber 6 so as to be in communication with the bores 23. Thus, surfaces are formed on both sides of rotary disk 7 on which the oil pressure acts and these surfaces are identical so the forces are equal for balancing the oil pressures applied to the opposite side surfaces of the rotary disk 7 and thus it can be prevented that the oil pressure serves as a resistance against rotation of the rotary disk 7.

It is preferable that each of the openings 19, 20, 21, 22 and 23 in the rotary disk 6 be circular as illustrated, whereby the manufacture of the rotary disk can be simplified and facilitated.

Thus, according to this invention, in a steering apparatus of the type in which an oil pump is selectively connected to opposite end chambers of a power steering cylinder through an operation valve driven by a steering handle, the operation valve is of rotary type and comprises a rotary disk contained in a valve chamber, and oil supply and oil return openings for the valve are all made only in one side surface of the valve chamber, so that these openings can be concentrated on one side and the whole of the apparatus can be of small size. Additionally, oil conducting openings made in the rotary disk for communicating between the oil supply and oil return openings are formed as bores passing through the rotary disk, so that it can be prevented that oil pressure is applied to only one side surface of the rotary disk. Furthermore, the end openings of the oil supply and oil return passages open to the rotary disk constitute an area on which oil pressure acts on the rotary disk, but according to this invention another oil pressure area substantially equal to the foregoing oil pressure acting area is formed on the other side surface of the rotary disk and these two areas are in communication with each other through communication openings for balancing the oil pressure applied to the opposite side surfaces of the rotatable disk, to eliminate any oil pressure resistance against the rotation of the rotary disk whereby the handling of the apparatus can be smooth and light.

What is claimed is:

1. Power steering apparatus for a vehicle comprising a fluid pump, a power steering cylinder having a piston with chambers on opposite sides thereof, an operation valve driven by a steering handle and regulating flow from the pump to said chambers to effect corresponding steering of the vehicle, said operation valve comprising a rotary disk enclosed in a valve chamber having fluid supply and fluid return openings in one side surface thereof, said disk having fluid conducting openings communicating the fluid supply and return openings in a neutral steering position, and respectively connecting the supply and return openings with said chambers of said power steering cylinder in left and right steering positions, said conducting openings being through bores passing through the rotary disk, said valve chamber having an opposite side surface on the other side of said rotary disk, which opposite side surface is provided with openings which are symmetrical with said supply and return openings and have the same areas there as to balance forces acting on opposite sides of said disk, said disk having further circular bores therein providing communication between said supply and return openings and the symmetrical openings in the opposite side surface of the valve chamber, said supply and return openings having enlarged diameters where they open into said valve chamber, said openings in said opposite side surface of the valve chamber being equal in diameter to the enlarged diameters of the supply and return openings, said supply and return openings being grouped in diametrically opposed pairs at right angles to one another, said fluid conducting bores in said disk having the same diameter as the enlarged diameters of the supply and return openings and in said neutral steering position overlap said openings whereby fluid passes from the supply to the return openings without passing to the power steering cylinder, said fluid conducting bores being also grouped in diametrically opposed pairs at right angles to one another, said further bores communicating the supply and return openings with the symmetrical openings in the opposite side surface of the valve chamber are disposed between respective fluid conductig bores, and said openings in said opposite side surface of the valve chamber being constituted as circular cavities.

* * * * *